P. S. OSTGAARD.
HEN NEST.
APPLICATION FILED JULY 1, 1919.
1,325,038.
Patented Dec. 16, 1919.
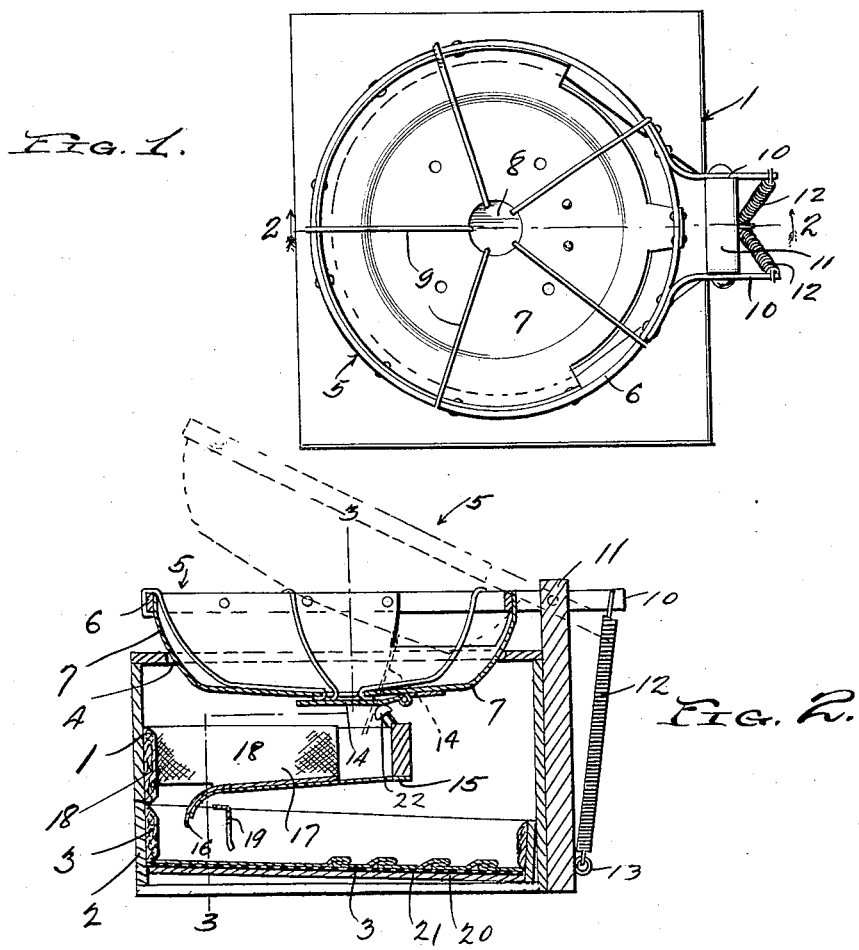
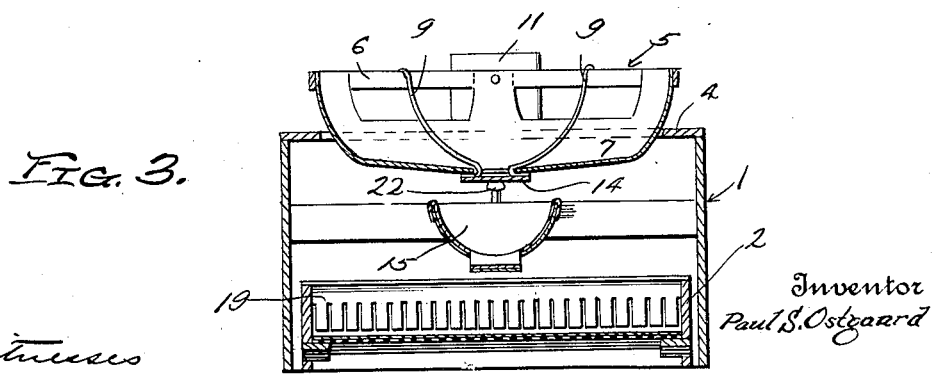

UNITED STATES PATENT OFFICE.

PAUL SELMER OSTGAARD, OF CLIMAX, MINNESOTA.

HEN-NEST.

1,325,038.  Specification of Letters Patent.  Patented Dec. 16, 1919.

Application filed July 1, 1919. Serial No. 307,935.

*To all whom it may concern:*

Be it known that I, PAUL SELMER OSTGAARD, a citizen of the United States, residing at Climax, in the county of Polk and State of Minnesota, have invented certain new and useful Improvements in Hen-Nests, of which the following is a specification.

This invention relates to poultry apparatus, and more particularly to nests.

The object of the invention is to provide a simply constructed and efficient nest operable by the entrance and exit of the hen to close and open respectively the egg outlet.

Another object is to provide simple means for conveying the egg deposited in and discharged from the nest to a suitable place of deposit without danger of breaking it.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a plan view of a nest constructed in accordance with this invention.

Fig. 2 is a central vertical section taken on the line 2—2 of Fig. 1 with the nest shown in lowered operative position in full lines, and in raised position in dotted lines, and Fig. 3 is a transverse section taken on the line 3—3 of Fig. 2.

In the embodiment illustrated, a box-like casing 1 is shown, having a sliding drawer 2 in the lower end thereof, padded on its sides and bottom as shown at 3, and which is designed to receive eggs laid in the nest proper supported by this casing.

The top of this casing has an opening 4 in which is designed to be mounted the nest proper 5 which is composed of a frame here shown in the form of a ring 6 having a suitable container 7 depending therefrom and which may be composed of any suitable material, preferably of canvas or the like. This container 7 has a central opening 8 and reinforcing bars 9 extending radially from this opening having one end hooked around the edge of the opening and their other ends hooked over ring 6 as is shown clearly in Figs. 2 and 3.

Laterally spaced radial arms 10 project from the ring 6, being riveted or otherwise rigidly secured thereto and are pivotally engaged intermediately of their ends with a standard 11 which projects above the top of the casing 1 as is shown clearly in Figs. 2 and 3. These arms 10 operate as levers to support the nest proper and their rear free ends have attached thereto coiled springs 12 which converge toward their lower ends and are secured to an eye 13 projecting laterally from the rear face of the standard 11. These springs 12 exert their tension to raise the nest 5 into the dotted line position shown in Fig. 2 and normally hold the nest in this position, the springs being of sufficient strength to overbalance the weight of the nest.

A flap closure 14 is hinged to the lower face of the container 7 adjacent one side of the opening 8 and is designed to extend over and completely close said opening when in operative position as shown in full lines in Fig. 2. When the nest 5 is raised or tilted into the position shown in dotted lines in Fig. 2, this flap closure drops by gravity into the position shown in dotted lines in Fig. 2.

The egg chute 15 is mounted within the casing 1 below the nest 5 and inclines downwardly toward the front of the casing having a downturned lip 16 at its front end for directing eggs passing thereover into the drawer 2. The side and end walls of this chute are padded as shown at 18 so that there will be no danger of the eggs passing through the chute being broken.

Arranged transversely across drawer 2 just below the discharge end of the chute 15 is what may be termed a bumper 19 composed of any suitable fabric and which is designed to retard the speed of the eggs when they reach the drawer bottom. The padding 3 in the bottom of this drawer is shown provided with longitudinally spaced transversely extending ribs 20 which form between them egg seats 21, said ribs being inclined rearwardly to facilitate the passage of the eggs over them as is shown clearly in Fig. 2.

A stop 22 in the form of a headed pin is mounted on the inner end of the egg chute 17 and projects forwardly into the path of the flap-like closure 14 so that when the nest 5 is lowered this closure will contact with the stop 22 and be forced upwardly and retained thereby in the position shown in Figs. 2 and 3.

In the use of this nest, the parts being in the position shown in dotted lines in Fig. 2, a hen perching on the frame 6 of nest 5 will cause said nest to lower into the full line position shown in Figs. 2 and 3 and when she enters this nest, her weight will overcome the tension of springs 12 and operate to hold the nest in lowered position with the door or closure 14 covering the opening 8. After the hen has deposited her egg, and when she leaves the nest 5, the springs 12 will overbalance nest 5 and cause it to tilt up into the dotted line position shown in Fig. 2 which permits the flap-like closure 14 to drop downwardly by gravity uncovering the opening 8 and permitting the deposited egg to pass out through said opening into the chute 17 by which it will be conveyed to the drawer 2 disposed below it, and will pass back to the rear of the drawer resting in one of the seats 21 above described.

The bottom of drawer 2 is shown inclined upwardly and forwardly so as to cause the egg dropped on to the elevated front portion thereof to pass by gravity toward the rear.

From the above description it will be obvious that this nest may be used by any number of hens, and at the end of the day, or any other time, the drawer may be drawn out and the eggs removed and all danger of them becoming injured or addled by the heat from the bodies of the various hens is avoided. This nest is also useful in cold weather to protect the eggs and prevent them from freezing when collections are made at long intervals or the weather is extremely cold.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

1. A nest of the class described comprising a supporting structure, a nest carried thereby and movable in a vertical plane and provided with an opening in its bottom, a downwardly opening flap closure for said opening, and means in the path of said nest to engage said closure and shut it on the lowering of the nest.

2. A nest of the class described comprising a supporting structure, a nest carried thereby and movable in a vertical plane and provided with an opening in its bottom, a closure for said opening, and means operable on the lowering of the nest to close said closure.

3. A nest of the class described comprising a supporting structure, a nest carried thereby and movable in a vertical plane and having an opening in its bottom, a downwardly opening flap closure for said opening, a stop carried by said structure positioned to engage said closure on the lowering of the nest to close the opening.

4. A nest of the class described comprising a supporting structure, a nest carried thereby and movable in a vertical plane and having an opening in its bottom, yieldable means for holding said nest normally in raised position, a chute arranged below said nest and inclined downwardly, a closure for said opening, hinged to the bottom of the nest at one side of said opening, a stop carried by said chute in position to engage said closure on the lowering of the nest to close it and hold it in closed position.

5. A nest of the class described comprising a casing having an opening in its top, a standard rising from one wall of said casing above the top thereof, a nest fulcrumed on the upper end of said standard and movable in said opening, said nest having an opening in its bottom, coiled springs connected with said nest and casing to overbalance the nest and hold it normally in raised position, a closure hinged to the bottom of said nest adjacent said opening, means for receiving the egg discharged from said nest and conducting it into said casing without danger of breakage, and means for closing said closure on the lowering of the nest.

In testimony whereof I affix my signature in presence of two witnesses.

PAUL SELMER OSTGAARD.

Witnesses:
N. ROSHOLT,
C. M. KNUTSON.